United States Patent Office 3,560,250
Patented Feb. 2, 1971

3,560,250
MATERIAL AND PROCESS FOR THE MANUFACTURE OF COATINGS ON CELLULOSE HYDRATE FILM
Wilhelm Brandt and Irmgard Bindrum, Wiesbaden-Biebrich, Germany, assignors to Kalle Aktiengesellschaft, Wiesbaden-Biebrich, Germany
No Drawing. Filed Dec. 1, 1966, Ser. No. 598,197
Claims priority, application Germany, Dec. 4, 1965,
K 57,829
Int. Cl. B44d *1/50;* B32b *23/08*
U.S. Cl. 117—93.31     4 Claims

ABSTRACT OF THE DISCLOSURE

A process which comprises applying onto the surface of a regenerated cellulose hydrate film an aqueous dispersion of a vinylidene chloride copolymer and a solution containing a phenoplast or an aminoplast in a water-diglycol mixture, and heating the surface of the film with a high frequency field or infrared radiation to a temperature range of 120° to 140° C., and product of said process.

---

The present invention relates to aqueous vinylidene chloride copolymer dispersions containing adhesive additives by means of which coatings on films of regenerated cellulose hydrates can be manufactured without additional adhesive layers. The invention also relates to a process for using such dispersions by means of which very firmly adhering coatings are obtained on films of regenerated cellulose hydrates.

Copolymers of vinylidene chloride, particularly those with acrylic esters and/or unsaturated acids or the anhydrides thereof are good film-forming agents. The films manufactured therefrom show a very low permeability to gas and water vapor; they also are easily sealable. Films from regenerated cellulose hydrates do not have such properties or possess them only to a small extent. Therefore, the latter are often coated with thin films of the aforementioned vinylidene chloride copolymers.

Coating preferably is performed by application of aqueous dispersions of the polymers. Aqueous dispersions are used to prevent using inflammable and, in most cases, also expensive organic solvents. Such aqueous dispersions which contain vinylidene chloride copolymers as film-forming agents are known, for example, from British Pat. No. 692,154. Since films from vinylidene chloride copolymers only have poor adhesion when they are applied from aqueous dispersions directly onto the surfaces of films of regenerated cellulose hydrates, it has hitherto been usual to provide the films, prior to coating them with the aqueous dispersion, with a suitable adhesive layer. The adhesive layers usually consist of formaldehyde condensation products, e.g., from condensation products of formaldehyde and melamine.

Since the application of an intermediate adhesive layer is an expensive operation, tests have been made to find conditions under which it is possible to apply aqueous vinylidene chloride copolymer dispersions directly without an adhesive pretreatment. The hitherto known efforts in this direction, however, have not been made with regard to coating films of regenerated cellulose hydrates, but to coating other films. It is known, for example, from Belgian Pat. No. 585,717, to coat films from polystyrene in one operation with aqueous dispersions of vinylidene chloride copolymers which must contain free carboxyl groups and to which 0.75–2 percent by weight of urea/formaldehyde precondensates have been added as adhesives. Attempts to coat films of regenerated cellulose hydrates with dispersions of this kind, however, resulted in coatings which did not firmly adhere and, in most cases, also did not show the required transparency.

Furthermore, it has been found that the known water-soluble formaldehyde condensation products used as adhesive additives and prepared in the usual manner do not fulfill a substantial requirement, i.e., they are not compatible with the dispersion for a sufficient length of time. Moreover, the condensation products have the common disadvantage that, when added to the dispersion, they provide sufficient adhesion between the coating and the support only in the freshly prepared state and are fully effective only for a few hours or days. This may result in the first place from the fact that the condensates in the aqueous solutions continue to react with themselves and lose reactivity as regards the coating and the support.

The present invention provides a process for obtaining firmly adhering coatings in a simple manner by coating with aqueous vinylidene chloride copolymerdispersions. The invention solves this problem by means of a dispersion which contains a new adhesive additive as well as by means of a particular process step following the application of the dispersion.

The aqueous vinylidene chloride copolymer dispersions of the invention, for the manufacture of coatings on films from regenerated cellulose hydrates with an adhesive in the dispersion, contain a phenoplast and/or an aminoplast in an amount, per 100 parts by weight of vinylidene chloride copolymer, as results from 0.01–1.0 part by weight of phenol and/or amine, the phenoplast and/or aminoplast being prepared in a manner such that 0.5–5 parts by weight of an amine and/or phenol are condensed for 15 to 120 seconds, preferably 30 seconds, in an acid reaction and thereafter in an alkaline reaction with 10 to 50, preferably 20 to 35, parts by weight of formaldehyde in a mixture of 17 to 50 parts by weight of water and 83 to 50 parts by weight of an organic solvent which is completely miscible with water in the indicated range.

As organic solvents compatible with water there may be used, for example: tetrahydrofurane, dimethyl sulfoxide, 4-methylol-1,3-dioxane, 4,4-dimethyl-1,3-dioxane, 1,4-dioxane, 1,4-butane-diol, isopropanol, ethanol, triglycol, glycerol, glycol, and diglycol. The use of diglycol has been found to be particularly advantageous.

As starting material for the preparation of the formaldehyde condensation products, paraldehyde may be used instead of formaldehyde.

Suitable starting materials for the preparation of suitable phenoplasts are phenol itself as well as lower alkyl phenols, e.g. cresols. But polyvalent and polynuclear phenols, such as p,p′-dihydroxy-diphenyl-dimethyl-methane, known under the name bisphenol-A, also may be employed. Also, phenols having carboxyl groups or sulfo groups may be employed for the preparation of phenoplasts suitable for use in the invention. Principally, all condensation products of phenols with formaldehyde which are indicated in Ullman's, "Enzyklopädie der technischen Chemie," third edition, 1962, vol. 13, page 424 et seq., may be used, with the exception of those condensed in the presence of alkaline earth hydroxides since the dispersion is susceptible to alkaline earth ions.

Aminoplasts are the condensation products of formaldehyde with urea, thiourea, melamine, guanidine or dicyandiamide. Any mixtures of the starting materials may be condensed together; melamine/phenol mixtures or melamine/urea mixtures are preferred. All amines indicated in the aforementioned encyclopedia of Ullman, third volume, page 574 et seq., for the preparation of aminoplasts are principally suitable.

It has been found advantageous not to isolate the condensation products from the solution in which they are formed but to mix this solution directly with the dispersion of the vinylidene chloride copolymers. For this purpose, it is necessary to meet certain condensation requirements.

One hundred parts of the mixture used as the condensation medium and consisting of water and organic solvent should contain at least 50, and at the most 83, parts by weight of the organic solvent. Contents of 50 to 75 parts by weight of organic solvent preferably are employed. One hundred parts by weight of the condensation medium should contain 10 to 50, preferably 15 to 25, parts by weight of formaldehyde. The necessary mixtures may be obtained, for example, by mixing the organic solvent with the appropriate quantity of a 30 to 40% by weight aqueous formaldehyde solution. But it also is possible to add the formaldehyde to the reaction mixture at the end. Furthermore, 100 parts by weight of the liquid reaction medium should contain at least 0.8 part by weight of phenol, urea, thiourea, melamine or dicyandiamide. The upper concentration limit of the materials, with the exception of melamine, is 17 parts by weight per 100 parts by weight of condensation medium. With melamine, 5 parts by weight should be used at the most.

It has been found advantageous to employ temperatures of 40 to 80° C. for condensation. Preferred results are obtained when the reaction mixture is maintained at temperatures between 60 and 70° C. The usual manner is to heat the solvent mixture to the desired temperature and, with stirring, to add the condensable amines and/or phenols or mixtures thereof and finally the formaldehyde. The mixture usually becomes slightly acid; in most cases, a pH of about 6 is obtained. If this is not the case, suitable additives are employed to reach this pH value.

After addition of the formaldehyde as quickly as possible, the mixture at a pH<7, is intensely stirred for a short period and the acid condensation reaction is then stopped by adding alkali; a pH above 7, preferably about 8, should be obtained. The condensation time in an acid medium should be at the most 120 seconds, preferably 30 seconds, but not less than 10 seconds. It has been found advantageous to use alkali hydroxides for adjusting the pH value. The after-condensation should be performed at temperatures between 30 and 80° C., preferably at temperatures between 60 and 70° C. The reaction times are between a quarter of an hour and five hours, generally, however, two hours.

The condensation products thus obtained are not isolated after condensation, but directly added to the solution of the aqueous vinylidene chloride copolymer dispersion. The finished dispersion should have a pH value above 7. Small additions of phosphates often have a stabilizing effect on the solutions of the condensation products.

The dispersions of the present invention may be stored for a long time without changes in their properties; the viscosity of the dispersions does not increase. The adhesion of the top coatings prepared from the dispersions of the present invention on films of regenerated cellulose hydrates is sufficient, but insufficient for greater stress.

The present invention also provides a process for the manufacture of firmly adhering coatings on films of regenerated cellulose hydrates by coating the vinylidene chloride copolymer dispersions of the present invention onto the surfaces of films of regenerated cellulose hydrates and by subsequent drying. The coated film is dried until a water content of less than 8 percent by weight, calculated on the weight of the entire film, is obtained and the dried film is then exposed for 0.1 to 5 seconds to a high-frequency field or infrared radiation, the intensity of which is such that surface temperatures of the film of 120 to 140° C. are attained.

Coating with the aqueous vinylidene chloride copolymer dispersions of the present invention is performed in a known manner in coating machines suitable for such purposes. It may be performed by dip or roll coating and the excess dispersion may be removed by an air-brush or a doctor knife. Drying is effected by hot air having a temperature between 100 and 140° C. The dispersion is applied in an amount such that the dried coating has a thickness of about 0.5 to 3$\mu$.

The process step of after-heating is performed, for example, by means of infrared radiators extending over the width of the web. The conditions indicated are fulfilled, for example, by means of a radiator the power absorption of which is 6 watts per cm.$^2$ of radiator surface at a distance of 13 cm. between the surface of the radiator and the film.

When using a high-frequency field, the indicated limits are attained, for example, by means of a high-frequency generator of 15 mc./s. at a voltage of 9 kv. and a high-frequency power of 5.5 kw. if the electrode distance is 65 mm.

During after-heating, the water content should not decrease below 5 percent by weight since otherwise the support material becomes brittle. For this reason, after-heating with infrared radiators or in the high-frequency field is advisable since then a very short heating time is sufficient during which no decrease in the water content occurs. This is not the case when the heat is transferred to the film by hot air. Heat transfer by air convection requires either undesirably high temperatures of the heat carrier or long heating times.

By means of after-heating, a strong bond is obtained between the supporting cellulose hydrate material and the top coating. This is the case, to a certain degree, even with coatings without adhesive additives. Sometimes it can be observed that, in the presence of adhesive additives, the adhesion of the copolymers does not have the maximum value until one or two days after coating and heating. This is particularly true when the content of softening agent of the film is high, i.e., when it is above 8 to 10 percent by weight.

The adhesive strength of the copolymer coating on the cellulose hydrate support may be tested in a manner whereby the force required for separating the support and the coating of a film stored in the heat-sealed state for three days in air of 90 percent relative humidity is determined, or in a manner whereby the coated film is placed in boiling water and the time is determined during which the film remains in the boiling water and until the coating just begins to separate from the support.

The invention will be further illustrated by means of the following example. The adhesive strength of the coated films manufactured according to this example is shown in the table below. All parts are by weight unless stated otherwise.

EXAMPLE 594 parts of salt-free water are placed into a polymerization vessel. Therein there are first dissolved 3.58 parts of itaconic acid and then 0.54 part of sodium alkyl naphthalene sulfonate and 10.4 parts of a 30 percent aqueous solution of a condensation product from formaldehyde and sodium naphthalene sulfonate. The completeness of dissolution is tested by sampling. Then, 1.57 parts of ammonium persulfate and 0.79 part of sodium pyrosulfite are added and the vessel is closed. The vessel is three times alternately evacuated and filled with nitrogen, without agitation. Into the evacuated vessel, with agitation, there is then filled a mixture prepared in a separate vessel and consisting of 330 parts of vinylidene chloride, 7.4 parts of butyl acrylate, and 14.4 parts of methyl methacrylate. Then, the vessel filling is heated to 45° C. by circulation heating; when this temperature has been reached, the wall of the vessel is cooled. Within 20 minutes, the internal temperature increases to 76° C. and begins to fall again. The reaction pressure reaches the maximum value of 5.5 atmospheres gauge. When the internal temperature has fallen again to 60° C., cooling of the wall is stopped. Polymerization is finished with circulation heating at 45° C.; this is performed when the pressure has decreased again to normal atmospheric pressure.

A polymer dispersion having the following characteristics thus is obtained:

Dry substance—38.9%
Viscosity according to Hoeppler at 20° C.—4.0 cp.
Surface tension—68.4 dynes/cm.
Vinylidene chloride content in the copolymer—91.8%

Dispersion 1

0.25 g. of toluene sulfonic acid, 0.25 g. of ammonuim chloride as a condensation accelerator, and 0.10 g. of finely ground melamine were added to 2.12 kg. of diglycol heated to 70° C. The melamine was suspended in the mixture with vigorous stirring. After about 5 minutes, 0.08 kg. of pure urea was added and, after about two additional minutes, 1.5 kg. of 40% formaldehyde solution were poured in at one time with stirring. After 30 seconds, a solution of 0.1 kg. of potassium hydroxide (analytical grade) in 100 ml. of water was added and stirring was continued for 1.75 hours at 60° C. to 65° C.

Solution 2

1000 g. of this solution contain the formaldehyde condensation product from 25 g. of melamine and 20 g. of urea.

When the condensation is performed in water and not in a mixture of water and diglycol, a highly viscous solution is obtained which is unsuitable as an additive to the vinylidene chloride copolymer dispersion since it does not effect anchorage on the cellulose hydrate film.

3 g. of the condensation product (solution 2) which contains the condensation product from 0.075 g. of melamine and 0.60 g. of urea with formaldehyde were stirred into 1000 g. of copolymer (dispersion 1) having a solids content of 30 percent.

A cellulose hydrate film was coated with this dispersion. Drying was performed in moving hot air at 120° C. until the water content of the coated film was 6 percent. The thickness of the coating was 2.3μ.

The thus coated film is listed in the table as film I. Film Ia was not after-heated, film Ib was after-heated for two seconds and film Ic for three seconds by means of an infrared radiator.

In a parallel test, cellulose hydrate film was coated with the same vinylidene chloride copolymer (dispersion 1), but which did not contain an addition of condensation product (solution 2). The water content of the coated film was 6 percent by weight and the coating thickness 2.4μ. This film is listed in the table as film II. Film IIa was not afterheated, film IIb was after-heated for two seconds and film IIc for three seconds by means of an infrared radiator.

In the table below, the second and third vertical columns show the forces required for separating the support and the coating of the differently treated films having sealed seams of 1 cm. width. The temperature of the sealing jaws was 130° C., the pressure of the sealing jaws was 150 g./cm.², and the sealing time was 4 seconds.

The right hand column shows the times until separation of the coating occurred in boiling water, i.e., the adhesion times in boiling water.

Similar results were obtained when using the high-frequency generator described above. When the coated film had been exposed to the high-frequency field, the adhesion times in boiling water of the heated film were the following: about 7 minutes after 0.25 second, about 20 minutes about 0.50 second, and more than 60 minutes after 1.0 second.

As can be seen from the table below, by the addition of condensation products according to the invention and the short after-radiation of the coating dried in hot air, particularly good adhesion is achieved of the film from vinylidene chloride copolymers on the cellulose hydrate support after storage in a humid atmosphere. If there is no after-radiation, the adhesion is definitely poorer but still better than with coatings without additive.

TABLE I

| | Separating force, in grams | | Adhesion times in boiling water, in minutes |
|---|---|---|---|
| | 60% relative humidity [a] | 90% relative humidity [b] | |
| Film I (coating with additive): | | | |
| (a) Not after-radiated | 20 | 5 | 2 |
| (b) After-heated for 2 seconds with infrared radiator | 70 | 20 | >60 |
| (c) After-heated for 3 seconds with infrared radiator | 130 | 100 | >60 |
| Film II (coating without additive): | | | |
| (a) Not after-radiated | 10 | 0 | 1 |
| (b) After-heated for 2 seconds with infrared radiator | 40 | 0 | 5 |
| (c) After-heated for 3 seconds with infrared radiator | 70 | 10 | 8 |

[a] Film stored at 60% relative humidity, sealed, separated immediately.
[b] Film sealed, stored for 3 days at 90% relative humidity, then separated.

It will be obvious to those skilled in the art that many modificatiins may be made within the scope of the present invention without departing from the spirit thereof, and the invention includes all such modifications.

What is claimed is:

1. A process for the preparation of a firmly adherent coating on a regenerated cellulose hydrate film which comprises applying onto the surface of a regenerated cellulose hydrate film an aqueous dispersion of a vinylidene chloride copolymer and a solution containing at least one compound selected from the group consisting of a phenoplast or an aminoplast in a quantity, per 100 parts by weight of a copolymer, resulting from the reaction of 0.01 to 1 part by weight of a compound selected from the group consisting of phenol and an amine, to produce the corresponding phenoplast or aminoplast, said solution being formed by condensing 0.5 to 5 parts by weight of a compound selected from the group consisting of phenol and an amine for 15 to 120 seconds in an acid reaction and then in an alkaline reaction with 10 to 50 parts by weight of formaldehyde in a mixture of 17 to 50 parts by weight of water and 83 to 50 parts by weight of a mixture of 50 to 25 parts by weight of water and 50 to 75 parts by weight of diglycol; drying the coated film until a water content is obtained of less than 8 percent by weight, based on the weight of the entire film, and heating the surface of the film to a temperature in the range of about 120 to 140° C.

2. A process according to claim 1 in which the film surface is heated by exposing it to a high frequency field.

3. A process according to claim 1 in which the film surface is heated by exposing it to infrared radiation.

4. An article formed by the process of claim 1.

References Cited

UNITED STATES PATENTS

| | | | |
|---|---|---|---|
| 3,085,030 | 4/1963 | Hendrickson et al. | 117—145 |
| 3,166,435 | 1/1965 | Meier | 117—145X |
| 3,281,263 | 10/1966 | Priesing et al. | 117—93.31X |
| 3,364,062 | 1/1968 | Mitchell et al. | 117—145X |
| 3,409,460 | 11/1968 | Mitchell et al. | 117—93.31 |
| 2,910,385 | 10/1959 | Berry et al. | 117—145X |

FOREIGN PATENTS

| | | | |
|---|---|---|---|
| 795,778 | 5/1958 | Great Britain | 117—145 |
| 795,780 | 5/1958 | Great Britain | 117—145 |
| 796,067 | 6/1958 | Great Britain | 117—145 |
| 628,361 | 10/1961 | Canada | 117—145 |
| 677,329 | 12/1963 | Canada | 117—145 |

WILLIAM D. MARTIN, Primary Examiner

M. R. LUSIGNAN, Assistant Examiner

U.S. Cl. X.R.

117—93.2, 145